United States Patent
Matzner et al.

[15] 3,696,131
[45] Oct. 3, 1972

[54] AROMATIC ACID DIAMIDES OF DIAMINO DIPHENYL SULFONES

[72] Inventors: Markus Matzner, Edison; Walter T. Reichle, Millington; Sui-Wu Chow; James E. McGrath, both of Somerville, all of N.J.

[73] Assignee: Union Carbide Corporation, New York, N.Y.

[22] Filed: April 6, 1970

[21] Appl. No.: 26,053

[52] U.S. Cl. ..........................260/397.6, 260/78 L
[51] Int. Cl. ...........................................C07c 103/22
[58] Field of Search................................260/397.6

[56] References Cited

UNITED STATES PATENTS 2,260,626  10/1941  Kleiderer et al. ........260/397.6
3,138,572  6/1964  Leandri..................260/397.6

OTHER PUBLICATIONS

J.A.C.S. 67: 1979– 80 (1945) Heymann et al.

Primary Examiner—Henry R. Jiles
Assistant Examiner—S. D. Winters
Attorney—Paul A. Rose, Aldo J. Cozzi, Gerald R. O'Brien, Jr. and James J. O'Connell

[57] ABSTRACT

Compounds of the structure

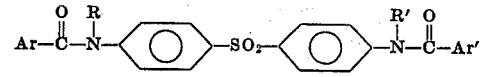

wherein Ar and Ar' are mono- or polynuclear aromatic radicals, and
R and R' are $C_1$ to $C_{20}$ hydrocarbon radicals These compounds are useful as initiators or activators in the anionic polymerization of lactam monomers.

3 Claims, No Drawings

AROMATIC ACID DIAMIDES OF DIAMINO DIPHENYL SULFONES

BACKGROUND OF THE INVENTION

1. Field of the Invention

The invention relates to novel aromatic acid diamide derivatives of N, N' substituted diamino diphenyl sulfones.

2. Description of the Prior Art

Certain diamino diphenyl sulfone derivatives, including certain diamides, have been prepared as disclosed in the Journal of the American Chemical Society, Volume 67, pages 1,979 to 1,990 (1945). The thus disclosed compounds were evaluated for biological activity.

Although the $SO_2$ group which links the phenyl radicals in this type of sulfone compound also tends to activate the entire compound for various types of chemical reactions, it has been found that the diamine compounds, as well as the bis(acetamide) and bis(benzamide) derivatives of the diamine compounds are not active enough to be used as initiators in the anionic polymerization of lactam monomers.

Attempts to use acetanilide as an initiator for the anionic polymerization of ε-caprolactam were also unsuccessful, Am. Chem. Soc., Div. Polym. Chem., Preprints 9 (1), at page 394, (1968).

SUMMARY OF THE INVENTION

Certain aromatic acid diamide derivatives of N,N'-substituted diamino diphenyl sulfone compounds are provided as novel compounds which are useful as initiators in the anionic polymerization of lactam monomers.

An object of the present invention is to provide for a novel class of derivatives of diamino diphenyl sulfone compounds.

A further object of the present invention is to provide compounds which may be useful as initiators or activators in the anionic polymerization of the lactam monomers.

DESCRIPTION OF THE PREFERRED EMBODIMENT

The novel compounds of the present invention have the structure

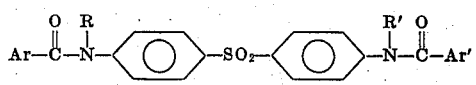

wherein Ar and Ar' are the same or different mono- or polynuclear aromatic radicals, and R and R' are the same or different $C_1$ to $C_{20}$, inclusive, hydrocarbon radicals.

The Ar and Ar' radicals may be substituted with one or more inert substituent radicals. The inert substituent radicals are those which are capable of being substituted on aromatic rings and which are inert to the components of the reaction systems in which the novel compounds of the present invention are formed, as well as to the basic components of the lactam polymerization systems in which they may be employed, i.e., the lactam monomer and the anionic polymerization catalyst.

Where the Ar and Ar' radicals contain a plurality of phenyl rings, the rings may be fused together, or bonded together through a single covalent bond or through an intervening polyvalent inorganic or organic radical.

The preferred Ar and Ar' radicals are substituted or unsubstituted phenyl and naphthyl radicals.

The R and R' radicals may be saturated or unsaturated. Such radicals would include aliphatic, alicyclic and aromatic radicals such as methyl, ethyl, propyl, butyl, cycloheptyl, cyclohexyl, allyl, propenyl, hexadienyl, octadienyl, phenyl, benzyl and naphthyl radicals.

The R and R' radicals may also be substituted with one or more inert substituent radicals. The inert substituent radicals are those which are capable of being substituted on R and R' hydrocarbon radicals and which are inert to the components of the reaction systems in which the novel compounds of the present invention are formed, as well as to the basic components of the lactam polymerization systems in which they may be employed, i.e., the lactam monomer and the anionic polymerization catalyst.

The preferred R and R' radicals are methyl, ethyl, propyl, phenyl and naphthyl radicals.

PREPARATION OF THE NOVEL COMPOUNDS

The novel compounds of the present invention are prepared by reacting a diamine compound having the structure

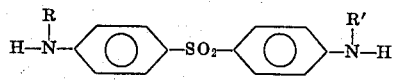

wherein R and R' are as defined above, with one or more acyl compounds having the structure

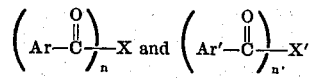

wherein Ar and Ar' are as defined above, n and n' are the same or different whole numbers and are 1 or 2, and when n and n' are 1, X and X' are the same or different and are OH or halogen radicals, and when n and n' are 2, X and X' are O radicals, to form the desired diamide compounds, and, when n and n' are 1 water or halogen acid is formed as a by-product, and when n and n' are 2 the acid of the acyl compounds is formed as a by-product.

The preferred acyl compounds for the purposes of the present invention are the acyl halides, notably the acyl chlorides. At least 2 moles of the acyl halide are used per mole of the diamine compound. When the acyl halides are used as the acyl compounds the reaction is preferably conducted in a halogen acid accepting solvent such as pyridine, alkyl substituted pyridines and triethylamine. At least one mole of the solvent is used per mole of halogen acid formed in the reaction. Excess solvent may be used for diluent purposes.

When water is a product, the reaction system preferably contains mechanical or chemical means for effectively removing the water so that the reaction may be driven to completion.

The use of different acyl compounds which contain different Ar and Ar' radicals could result in the preparation of diamides having unsymmetrical structures.

The reaction is conducted at atmospheric pressure and at temperatures of about 80° to 200° C. The preferred temperature is the reflux temperature of the mixture of the components of the reaction system. The reaction may be run under an inert blanket of a moisture free gas such as nitrogen. The reaction is usually conducted for a period of up to about 24 hours.

The diamide compounds of the present invention are crystalline materials which may be readily recovered from the reaction systems in which they are prepared by precipitation with water or by extraction with solvents such as chloroform followed by crystallization from appropriate solvents such as chloroform, aqueous ethanol or aqueous acetone.

The following examples are merely illustrative of the present invention and are not intended as a limitation upon the scope thereof.

EXAMPLE 1

Preparation of N,N'-dibenzoyl-N, N'-dimethyl-4,4' diamino diphenyl sulfone, i.e.,

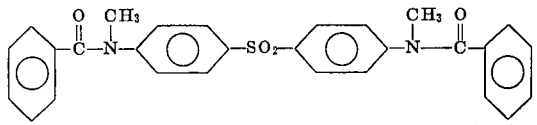

A solution of 56 g. (0.4 mole) of benzoyl chloride in 50 ml. of pyridine was added slowly to a solution of 27.6 g. (0.1 mole) of bis-(N-methyl-p-aminophenyl)sulfone in 80 ml. of pyridine. A mild exotherm was noted. When the exotherm ceased, the reaction solution was heated under reflux for 24 hours. The solution was poured into water and the bis-benzamide was separated from the water by extraction with chloroform. The chloroform solution was evaporated, and the residue was recrystallized successively from chloroform-carbon tetrachloride (1:2) and 20 percent aqueous ethanol. There was obtained 27 g. of the bis-benzamide, m.p. 125°–128°; nmr spectrum exhibited chemical shifts (TMS, in CDCl$_3$) at 7.71, 7.20, 7.15 for aromatic protons and 3.45 ppm for N-CH$_3$ group, with total aromatic proton to N-CH$_3$ area ratio of 2.94 to 1 (theory 3 to 1).

Elemental Analysis values for C$_{28}$H$_{24}$N$_2$O$_4$S
Calculated: S-6.62; N-5.78; C-69.48; H-4.99
Found: S-6.49; N-5.77; C-69.42; H-4.97

EXAMPLE 2

Polymerization of ε-caprolactam using the diamide compound prepared as in Example 1 as an anionic polymerization initiator.

Into each of two 25 × 200 mm test tubes was added 28.3 g. (0.25 mole) of molten caprolactam and both were then heated at a polymerization temperature of 160° C. Two (2) mol percent of a catalyst, sodium hydride, in the form of a dispersion (57 percent) in oil was added to one of these test tubes, while 1.0 mol percent of the initiator was added to the other. After solutions were formed and equilibrated with the bath temperature, they were mixed and then heated at the 160° C. polymerization temperature. The progress of the polymerization was followed visually. The time required for the development of opacity was taken as the time required for crystallization of the Nylon 6 formed.

The no-flow time for the polymerization system was one minute and the time required for crystallization was 1.5 minutes.

What is claimed is:

1. A compound having the structure

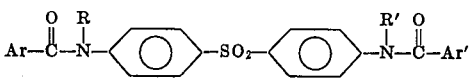

wherein Ar and Ar' are selected from the group consisting of unsubstituted phenyl and naphthyl radicals, and R and R' are selected from the group consisting of unsubstituted methyl, ethyl, propyl, butyl, cycloheptyl, cyclohexyl, allyl, propenyl, hexadienyl, octadienyl, phenyl, benzyl and naphthyl radicals.

2. A compound as in claim 1 in which Ar and Ar' are phenyl radicals.

3. A compound as in claim 2 which is N,N'-dibenzoyl-N,N'-dimethyl-4,4'-diaminodiphenyl sulfone.

* * * * *